US008428488B2

(12) United States Patent
Mizuishi et al.

(10) Patent No.: US 8,428,488 B2
(45) **Date of Patent: *Apr. 23, 2013**

(54) CHARGING DEVICE, PROCESS CARTRIDGE, IMAGE FORMING APPARATUS, AND TONER

(75) Inventors: Haruji Mizuishi, Tokyo (JP); Tokuya Ojimi, Kanagawa (JP); Toshio Koike, Kanagawa (JP); Takeshi Shintani, Kanagawa (JP); Yuji Arai, Kanagawa (JP); Takuzi Yoneda, Tokyo (JP); Ken Amemiya, Tokyo (JP); Takaaki Tawada, Kanagawa (JP); Masami Tomita, Shizuoka (JP); Masanori Kawasumi, Kanagawa (JP); Takaya Muraishi, Kanagawa (JP); Hiroomi Harada, Kanagawa (JP); Hiromichi Ninomiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/173,506

(22) Filed: Jun. 30, 2011

(65) Prior Publication Data

US 2011/0262179 A1 Oct. 27, 2011

Related U.S. Application Data

(63) Continuation of application No. 10/591,661, filed as application No. PCT/JP2005/004278 on Mar. 4, 2005, now Pat. No. 8,000,627.

(30) Foreign Application Priority Data

Mar. 11, 2004 (JP) ................................ 2004-068390

(51) Int. Cl.
*G03G 15/02* (2006.01)
*B29C 67/20* (2006.01)

(52) U.S. Cl.
USPC ............................ 399/100; 399/176; 264/321

(58) Field of Classification Search .................. 399/100, 399/176
See application file for complete search history.

(56) References Cited

U.S. PATENT DOCUMENTS 5,499,078 A 3/1996 Kurokawa et al.
5,633,701 A 5/1997 Yoshida
(Continued)

FOREIGN PATENT DOCUMENTS

EP 1 477 867 11/2004
JP 05 297690 11/1993
(Continued)

OTHER PUBLICATIONS

Office Action as received in the corresponding European Patent Application No. 05 720 549.4-1240 dated Mar. 9, 2012 (Translation only).

*Primary Examiner* — Walter L Lindsay, Jr.
*Assistant Examiner* — Erika J Villaluna
(74) *Attorney, Agent, or Firm* — Oblon, Spivak, McClelland, Maier & Neustadt, L.L.P.

(57) ABSTRACT

A cleaning roller cleaning a surface of a cleaning component, wherein the cleaning roller is provided in a roller configuration having a cylindrical shape and has a portion in contact with the cleaning component, the portion being made of a melamine resin foam having a continuous foam structure, the melamine resin foam being provided by heating compression from an original configuration in a radial direction, and wherein the portion in contact with the cleaning component has a continuous foam structure and a tensile strength in a range of 1.7±0.5 kg/$cm^2$, and an image forming apparatus incorporating the same.

17 Claims, 6 Drawing Sheets

U.S. PATENT DOCUMENTS

| | | | | |
|---|---|---|---|---|
| 5,873,019 | A | 2/1999 | Mizuishi | |
| 5,887,224 | A | 3/1999 | Mizuishi et al. | |
| 6,085,062 | A | 7/2000 | Mizuishi et al. | |
| 6,105,249 | A | 8/2000 | Ando et al. | |
| 6,128,449 | A | 10/2000 | Zenba et al. | |
| 6,144,822 | A | 11/2000 | Yamaguchi et al. | |
| 6,148,161 | A | 11/2000 | Usui et al. | |
| 6,266,501 | B1 | 7/2001 | Mizuishi et al. | |
| 6,740,460 | B2 | 5/2004 | Tomita et al. | |
| 6,928,255 | B2 | 8/2005 | Mizuishi | |
| 7,062,194 | B2 | 6/2006 | Yanagida et al. | |
| 7,477,862 | B2 * | 1/2009 | Takaya et al. | 399/100 |
| 2002/0163105 | A1 | 11/2002 | Kosaka et al. | |
| 2003/0039483 | A1 | 2/2003 | Funabashi | |
| 2004/0053154 | A1 | 3/2004 | Tomita et al. | |
| 2005/0063713 | A1 | 3/2005 | Watanabe et al. | |
| 2005/0152722 | A1 | 7/2005 | Tawada et al. | |

FOREIGN PATENT DOCUMENTS

| | | | |
|---|---|---|---|
| JP | 05297690 | | 11/1993 |
| JP | 9-43937 | | 2/1997 |
| JP | 11 288151 | | 10/1999 |
| JP | 2002-59443 | | 2/2002 |
| JP | 2002 132014 | | 5/2002 |
| JP | 2002 132019 | | 5/2002 |
| JP | 3087934 | | 6/2002 |
| JP | 2002-201299 | | 7/2002 |
| JP | 2002 221883 | | 8/2002 |
| JP | 2002-355211 | | 12/2002 |
| JP | 2003-53850 | | 2/2003 |
| JP | 2003 66807 | | 3/2003 |
| JP | 2003131521 | A | 5/2003 |
| JP | 2004-4414 | | 1/2004 |
| JP | 2004 4749 | | 1/2004 |
| JP | 2004-37516 | | 2/2004 |
| JP | 2004 53916 | | 2/2004 |

* cited by examiner

CHARGING DEVICE, PROCESS CARTRIDGE, IMAGE FORMING APPARATUS, AND TONER

CROSS REFERENCE TO RELATED APPLICATIONS

The present application is a Continuation of U.S. application Ser. No. 10/591,661, filed Sep. 5, 2006 now U.S. Pat. No. 8,000,627, now allowed, which is a 371 of PCT/JP05/04278, filed Mar. 4, 2005, the entire contents of each of which are hereby incorporated by reference. Further, the present application is based on and claims priority to Japanese patent application No. 2004-068390, filed on Mar. 11, 2004, the entire contents of which are hereby incorporated by reference.

TECHNICAL FIELD

The present invention relates to a charging device and a process cartridge and an image forming apparatus equipped with the charging device, in which charging processing to the image supporting medium is performed in the image forming apparatus of electrophotographic printing type, such as the copier, the laser printer, and the facsimile.

BACKGROUND ART

In the image forming apparatus of electrophotographic printing type, the surface of the photoconductor which is the image supporting medium is subjected to the charging processing by applying the charge of a predetermined polarity by the discharging, and the charged photoconductor surface is exposed to light so that an electrostatic latent image is formed. The toner which is charged with the same polarity as in the charging processing is supplied to this electrostatic latent image, and the toner image is formed. After that, the toner image formed on the photoconductor is transferred to the recording paper etc., and it is fixed to the record paper by applying the heat and the pressure.

Since the toner which is not used for the transferring remains on the photoconductor surface after the toner image is transferred, the photoconductor surface is cleaned by the cleaning components, such as the cleaning blade and the cleaning brush, before going into the following charging process.

In recent years, an improved method of charging the photoconductor surface in the above-mentioned image forming apparatus has been put in practical use. In the improved method, the charging roller which is formed in the shape of a roller by the conductive component is made to contact or approach the photoconductor surface, and the charging voltage between the charging roller and the photoconductor is supplied in this state, so that the charging device which charges the surface of the photoconductor can attain a low ozone concentration and low power consumption.

However, the remaining toner which remains on the photoconductor surface after the toner image is transferred is not completely removed in the cleaning process, and such toner may reach the region in the vicinity of or in contact with the charging roller. There is the problem that the remaining toner after the toner image transfer adheres to the charging roller.

Suppose that the toner which is contained in the remaining toner and charged to the same charging polarity is referred to as the regular polarity toner. When stirring the toner with the developer, the so-called reverse charging toner exists. The reverse charging toner is not charged to the regular polarity but charged to the reverse polarity.

The toner charged to the regular polarity repels the charging roller due to the static electricity, and it does not adhere to the charging roller surface. However, the reverse charging toner and the charging roller draw each other due to the static electricity, and it easily adheres to the charging roller surface.

Moreover, besides the reverse charging toner, the foreign matter, such as the paper chip, which is charged to the reverse polarity, will easily adhere to the charging roller due to the static electricity.

With the increasing demand for high-quality, very-fine images in recent years, the toner having spherical particles with smaller particle diameters has been used increasingly in the development process. The purpose of using this toner is to make the toner adhere to the electrostatic latent image precisely.

However, the toner having spherical particles with smaller particle diameters tends to penetrate through the cleaning blade in the cleaning process, and the penetrating toner makes the charging roller surface contamination increase further.

Moreover, in order to perform the charging processing on the surface of the photoconductor uniformly, there has been proposed the method of applying the charging bias in which the AC (alternating current) voltage is superimposed on the DC (direct current) voltage.

If the AC voltage is superimposed, the photoconductor surface will be damaged and its abrasion will increase. In order to prevent the abrasion of the surface of the photoconductor, it is desirable to protect the photoconductor surface.

Then, there has been proposed the method of applying the lubricant, such as the fatty acid metal salt, to the photoconductor surface for protecting the photoconductor surface. Applying the lubricant to the photoconductor surface allows reduction of the coefficient of friction on the surface of the photoconductor, and it works also to raise the rate of the transfer of the toner image, and the efficiency of cleaning of the remaining toner by the cleaning blade, etc.

However, the external additive particles with a certain hardness, such as silica particles, which are separated from the toner are easily caught by the thin layer of the lubricant provided in the photoconductor surface. When the photoconductor surface passes through the contact surface of the cleaning blade, the blade edge will be damaged in such a case so that the breakage and abrasion of the cleaning blade may arise.

If the abrasion of the cleaning blade progresses, the amount of the toner which passes through the cleaning blade will be increased and the charging roller surface contamination will also be increased.

As mentioned above, in order to prevent the adhesion of the toner passing through the cleaning blade to the charging roller and to avoid the difficulty in performing uniform charging of the photoconductor surface, it is necessary to clean the charging roller surface adequately.

As a cleaning component of the charging roller, the sponge material, such as foaming polyurethane and foaming polyethylene, has been proposed (see Japanese Laid-Open Patent Application No. 05-297690). Moreover, as a cleaning component of the charging roller, the brush roller has been proposed (see Japanese Laid-Open Patent Application No. 2002-221883).

Any of these cleaning components is brought in contact with the charging roller surface for friction so that the adhering matter, such as the toner, is removed from the charging roller surface.

In the case of the sponge material, the adhering matter will be accumulated in the internal pores of the sponge material. In the case of the brush roller, the adhering matter will be accumulated in the internal space between the fibers of the brush roller.

However, the amount of the adhering matter that can be accumulated by such cleaning components is limited, and it is difficult to maintain the cleaning performance of the cleaning components over an extended period of time. For example, it is required for the process cartridge including the charging roller to maintain the cleaning function of the charging roller so as to be suitable to the life of the other components. The use of the cleaning mechanism including the above-mentioned cleaning component is inadequate to meet the requirement.

On the other hand, in many cases of the conventional charging rollers, the elastic body, such as rubber or elastomer, in which the electric conduction agent is dispersed, is coated to the outer periphery of the core metal. Such elastic body easily produces the setting and the deformation with the elapsed time.

For this reason, in the charging device of the non-contact type in which the photoconductor and the charging roller are placed in proximity with no contact, the gap between the photoconductor and the charging roller varies with the elapsed time, and the problem, such as image unevenness, takes place due to the change of the charging potential.

For this reason, there has been proposed the charging roller which is constructed using the inelastic body, such as a thermoplastic resin, instead of the elastic body, such as rubber or elastomer (see Japanese Laid-Open Patent Application No. 2002-132019).

However, also in the image forming apparatus equipped with the charging roller constructed using the above-mentioned inelastic body, the problem of contamination of the charging roller surface by the toner penetrating through the cleaning blade which contacts the photoconductor arises similarly. Thus, it is desirable to provide a cleaning mechanism which is able to clean the charging roller surface adequately continuously over an extended period of time.

DISCLOSURE OF THE INVENTION

An object of the present invention is to provide an improved charging device in which the above-mentioned problems are eliminated.

Another object of the present invention is to provide a charging device which is equipped with a charging cleaning component which cleans the charging roller surface efficiently and maintains continuously the cleaning performance over an extended period of time, and is equipped with a charging roller which provide uniform charging of the image-supporting-medium surface stably.

Another object of the present invention is to provide a process cartridge and an image forming apparatus in which the above-mentioned charging device is provided and a quality image can be formed by performing uniform charging of the image-supporting-medium surface.

In order to achieve the above-mentioned objects, the present invention provides a charging device comprising: a rotatably supported charging roller charging a surface of an image supporting medium with an externally applied voltage; and a charging cleaning component cleaning a surface of the charging roller, wherein the charging roller comprises a resistance adjustment layer made of a resin composite and formed on an outer periphery of a core metal, and has a JIS-D hardness of 45 degrees or more, and the charging cleaning component comprises a portion in contact with the charging roller, the portion being made of a resin foam having a continuous foam structure and having a density in a range of 5 to 15 kg/m3 and a tensile strength in a range of 1.7±0.5 kg/cm2.

The above-mentioned charging device may be configured so that the resin foam which constitutes the charging cleaning component has an elongation percentage in a range of 20 to 40%.

The above-mentioned charging device may be configured so that the resistance adjustment layer of the charging roller is made of a thermoplastic resin in which a macromolecule type ion electric conduction agent is made to disperse.

The above-mentioned charging device may be configured so that the macromolecule type ion electric conduction agent contains polyether ester amide ingredients.

The above-mentioned charging device may be configured so that the macromolecule type ion electric conduction agent is made of a high molecular compound containing a 4th class ammonium salt.

The above-mentioned charging device may be configured so that the charging roller comprises a protection layer covering a surface of the resistance adjustment layer.

The above-mentioned charging device may be configured so that the protection layer has a resistance larger than a resistance of the resistance adjustment layer.

The above-mentioned charging device may be configured so that a difference in resistance between the protection layer and the resistance adjustment layer is $10^3$ ohm-cm or less.

The above-mentioned charging device may be configured so that the resin foam which constitutes the charging cleaning component is a melamine resin foam.

The above-mentioned charging device may be configured so that the charging cleaning component is provided in a roller configuration.

The above-mentioned charging device may be configured so that the melamine resin foam which constitutes the charging cleaning component is provided by heating compression to a compressibility of 30±15% from an original configuration in a radial direction.

The above-mentioned charging device may be configured so that the charging cleaning component is provided to exert pressure on the charging roller by gravity.

The above-mentioned charging device may be configured so that the charging cleaning component is provided to be rotated with rotation of the charging roller.

In order to achieve the above-mentioned objects, the present invention provides a process cartridge which is detachably disposed to an image forming apparatus body and includes at least an image supporting medium for supporting a latent image, and a charging device which are supported integrally, wherein the charging device comprises: a rotatably supported charging roller charging a surface of the image supporting medium with an externally applied voltage; and a charging cleaning component cleaning a surface of the charging roller, wherein the charging roller comprises a resistance adjustment layer made of a resin composite and formed on an outer periphery of a core metal, and has a JIS-D hardness of 45 degrees or more, and the charging cleaning component comprises a portion in contact with the charging roller, the portion being made of a resin foam having a continuous foam structure and having a density in a range of 5 to 15 kg/m3 and a tensile strength in a range of 1.7±0.5 kg/cm2.

The above-mentioned process cartridge may be configured so that the charging roller is disposed without contacting the image supporting medium.

The above-mentioned process cartridge may be configured so that the resin foam which constitutes the charging cleaning component has an elongation percentage in a range of 20 to 40%.

In order to achieve the above-mentioned objects, the present invention provides an image forming apparatus including: an image supporting medium supporting a latent image; a charging device charging a surface of the image supporting medium; an exposure unit forming an electrostatic latent image on the charged image-supporting-medium surface by exposing the surface to a light beam in accordance with image data; a development unit supplying a toner to the latent image on the image-supporting-medium surface and forming a visible image thereon; and a transfer unit transferring the visible image on the image supporting medium surface to a recording medium, the charging device comprising: a rotatably supported charging roller charging a surface of an image supporting medium with an externally applied voltage; and a charging cleaning component cleaning a surface of the charging roller, wherein the charging roller comprises a resistance adjustment layer made of a resin composite and formed on an outer periphery of a core metal, and has a JIS-D hardness of 45 degrees or more, and the charging cleaning component comprises a portion in contact with the charging roller, the portion being made of a resin foam having a continuous foam structure and having a density in a range of 5 to 15 kg/m3 and a tensile strength in a range of 1.7±0.5 kg/cm2.

The above-mentioned image forming apparatus may be configured so that the charging roller is disposed without contacting the image supporting medium.

The above-mentioned image forming apparatus may be configured so that the charging roller is supplied with an AC voltage superimposed on a DC voltage as the externally applied voltage.

The above-mentioned image forming apparatus may be configured so that the image forming apparatus comprises a cleaning unit including a cleaning blade which cleans the image-supporting-medium surface after the transferring of the visible image.

The above-mentioned image forming apparatus may be configured so that the image forming apparatus comprises a lubricant application unit which applies a lubricant to the image-supporting-medium surface.

The above-mentioned image forming apparatus may be configured so that the resin foam which constitutes the charging cleaning component has an elongation percentage in a range of 20 to 40%.

The above-mentioned image forming apparatus may be configured so that the toner used in the development unit has a volume mean particle diameter Dv in a range of 3 to 8 micrometers, and a ratio Dv/Dn of the volume mean particle diameter Dv to a number mean particle diameter Dn in a range of 1.00 to 1.40.

The above-mentioned image forming apparatus may be configured so that the toner used in the development unit has a shape factor SF-1 in a range of 100 to 180, and a shape factor SF-2 in a range of 100 to 180.

The above-mentioned image forming apparatus may be configured so that the toner used in the development unit is obtained by reaction of bridging and/or elongation of a toner material liquid in an aqueous solvent, and in the toner material liquid a polyester prepolymer having a functional group containing a nitrogen atom, a polyester, a colorant, and a mold lubricant are distributed in an organic solvent.

The above-mentioned image forming apparatus may be configured so that the toner used in the development unit is in a generally spherical configuration, the configuration being defined by a major-axis radius r1, a minor-axis radius r2, and a thickness r3 (r1≧r2≧r3), and a ratio r2/r1 of the major-axis radius r1 and the minor-axis radius r2 being in a range of 0.5 to 1.0, and a ratio r3/r2 of the thickness r3 and the minor-axis radius r2 being in a range of 0.7 to 1.0.

In order to achieve the above-mentioned objects, the present invention provides a toner for use in a development process of electrophotographic printing, the toner being used in the above-mentioned image forming apparatus, wherein the toner has a volume mean particle diameter Dv in a range of 3 to 8 micrometers, and has a ratio Dv/Dn of the volume mean particle diameter Dv to a number mean particle diameter Dn in a range of 1.00 to 1.40.

The above-mentioned toner may be configured so that the toner has a shape factor SF-1 in a range of 100 to 180, and a shape factor SF-2 in a range of 100 to 180.

The above-mentioned toner may be configured so that the toner is obtained by reaction of bridging and/or elongation of a toner material liquid in an aqueous solvent, and in the toner material liquid a polyester prepolymer having a functional group containing a nitrogen atom, a polyester, a colorant, and a mold lubricant are distributed in an organic solvent.

The above-mentioned toner may be configured so that the toner is in a generally spherical configuration, the configuration being defined by a major-axis radius r1, a minor-axis radius r2, and a thickness r3 (r1≧r2≧r3), and a ratio r2/r1 of the major-axis radius r1 and the minor-axis radius r2 being in a range of 0.5 to 1.0, and a ratio r3/r2 of the thickness r3 and the minor-axis radius r2 being in a range of 0.7 to 1.0.

According to the present invention, it is possible to provide a charging device which allows efficient cleaning of the charging roller surface, always makes the charging roller surface clean, and can maintain the charging characteristic stably by suppressing the fluctuation of the charging potential on the image supporting medium surface over an extended period of time.

Moreover, according to the process cartridge and the image forming apparatus in which the above-mentioned charging device is provided, it is possible to output a quality image stably through the uniform charging of the image-supporting-medium surface.

Other objects, features and advantages of the present invention will be apparent from the following detailed description when reading in conjunction with the accompanying drawings.

BEST MODE FOR CARRYING OUT THE INVENTION

A description will now be given of the preferred embodiments of the invention with reference to the accompanying drawings.

Figure 1:
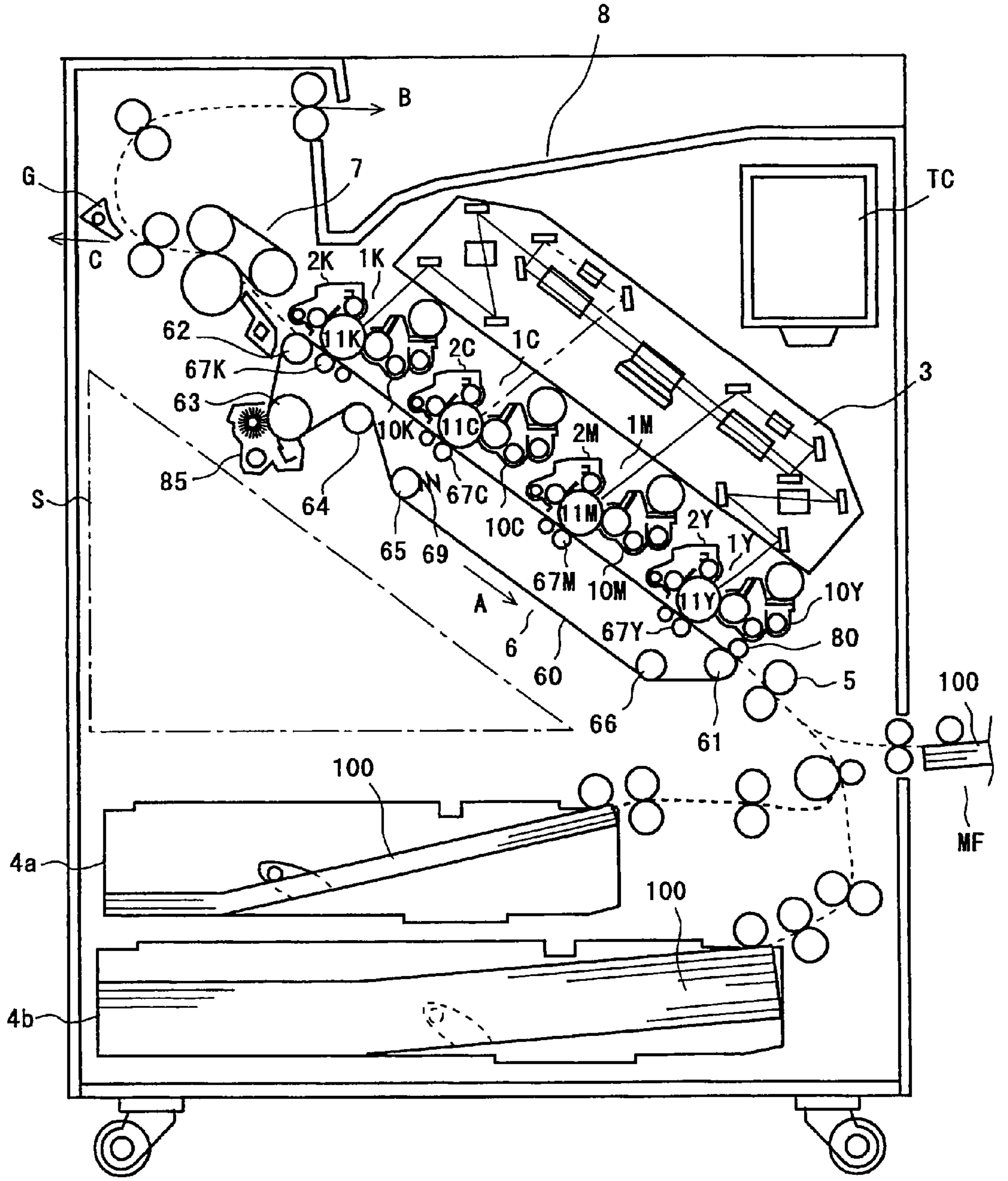
FIG. 1 is a diagram showing the composition of the image forming apparatus in which the charging device of the invention is embodied.
Figure 2:
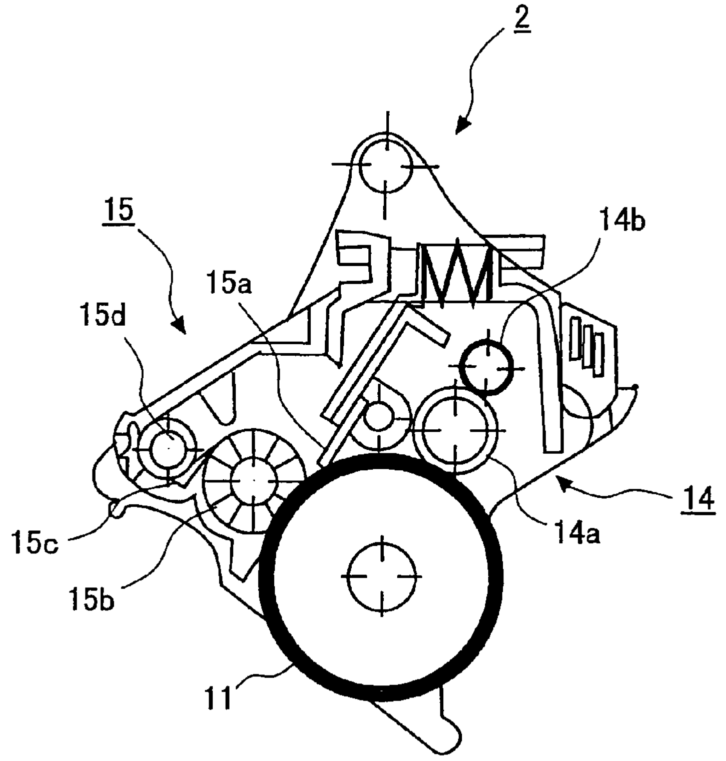
FIG. 2 is a diagram showing the composition of the photoconductor unit.

FIG. 1 shows the outline composition of the image forming apparatus in which the charging device of the invention is embodied. FIG. 2 shows the outline composition of the photoconductor unit.

This image forming apparatus comprises the four image-formation units 1Y, 1M, 1C, and 1K for forming the image of each color of the yellow (Y), the magenta (M), the cyan (C), and the black (K). In addition, the order of the colors of Y, M, C, and K is not limited to the embodiment of FIG. 1 and may be a different order.

The image-formation units 1Y, 1M, 1C, and 1K comprise the photoconductor drums 11Y, 11M, 11C, and 11K as the image supporting mediums, the charging units, the development units, and the cleaning units, respectively.

Moreover, the configuration of each of the image-formation units 1Y, 1M, 1C, and 1K is set up so that the axis of rotation of each photoconductor drum is in parallel and the rotation axes thereof are arranged at the predetermined pitch in the copy-sheet transfer direction.

Provided above the image-formation units 1Y, 1M, 1C, and 1K is the optical writing unit 3. The optical writing unit 3 has the light source, the polygon mirror, the fθ lens, the reflective mirror, etc., and irradiates the laser light in accordance with the image data and scans the surface of each of the photoconductor drums 11Y, 11M, 11C and 11K. Provided below the image-formation units 1Y, 1M, 1C, and 1K is the transfer unit 6. The transfer unit 6 is the belt driving device and has the transfer conveyance belt 60 which conveys and supports the copy sheet so that the copy sheet passes by the transfer region of each image-formation unit.

On the peripheral surface of the transfer conveyance belt 60, the cleaning device 85 which includes the brush roller and the cleaning blades is arranged to be in contact. The foreign matters, such as the toner adhering on the transfer conveyance belt 60 are removed by using the cleaning device 85.

Provided on the side surface of the transfer unit 6 is the fixing unit 7 of the belt fixing type, and provided at the upper part of the image forming apparatus is the ejection tray 8.

Provided at the lower part of the image forming apparatus are the feed cassettes 4*a* and 4*b* in which the copy sheet 100 is laid. Moreover, provided on the side surface of the image forming apparatus is the manual feed tray MF which is used when the paper is fed manually.

In addition, the image forming apparatus is equipped with the toner supply container TC, and the used toner bottle, the duplex/inversion unit, and the power-source unit, which are not illustrated, are provided in the space S indicated by the one-dot chain line in FIG. 1.

The developing devices 10Y, 10M, 10C, and 10K are the development unit and all have the same composition. They are the developing devices 10Y, 10M, 10C, and 10K of the 2 ingredient development type with which only the colors of the toner to be used differ, and the developer which includes the toner and the magnetic carrier is held.

The developing devices 10Y, 10M, 10C, and 10K include the developing roller which countered the photoconductor drum 11, the screw which conveys and stirs the developer, the toner concentration sensor, etc. The developing roller is comprised from the magnet fixed to the sleeve and the inside in which rotation of the outside is free. According to the output of the toner concentration sensor, the toner is supplied from the toner supply device.

The photoconductor units 2Y, 2M, 2C and 2K have the same composition, and as shown in FIG. 2, the photoconductor unit 2 comprises the photoconductor drum 11 on which the electrostatic latent image is formed, the charging device 14, and the cleaning device 15.

The cleaning device 15 comprises the cleaning-blade 15*a* which cleans the remaining toner which remains on the photoconductor drum 11 surface after the image transfer, and the cleaning-brush 15*b*.

The scraper 15*c* for removing the toner adhering to the brush fiber is in contact with the cleaning-brush 15*b*. The toner which remains by the scratching of the cleaning-blade 15*a* is transferred by the cleaning-brush 15*b* to the side of the toner conveyance unit 15*d* side and is made to convey the used toner collected by rotating the toner conveyance unit 15*d* in the used toner receipt region which is not illustrated.

Next, the charging device 14 according to the invention will be explained.

Figure 3:
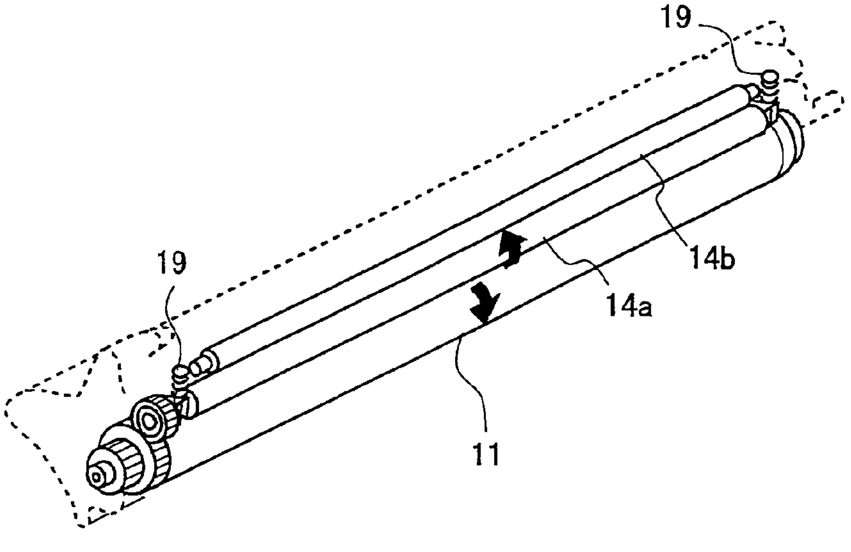
FIG. 3 is a perspective diagram showing the composition of the charging device according to the invention.

FIG. 3 is the perspective diagram showing the outline composition of the charging device according to the present invention.

As shown in FIG. 3, the charging device 14 comprises the charging roller 14*a* which is disposed in contact with the photoconductor drum 11, and the charging cleaning component 14*b* which is disposed at the location opposite to the location where the charging roller 14*a* contacts the photoconductor drum 11.

The charging roller 14*a* comprises the pressure springs 19 and 19 which are the components that exert pressure on the both ends of the charging roller 14*a* so that the charging roller 14*a* is pushed to the photoconductor drum 11.

The charging roller 14*a* may be arranged to be in contact with the photoconductor drum 11 directly. In the present embodiment, the charging roller 14*a* is arranged with a minute gap (not shown) to the photoconductor drum 11. The spacer component which has a fixed thickness is wound around the non-image-formation region of each of the ends of the charging roller 14*a*, and the surface of the spacer component is arranged to be in contact with the photoconductor drum 11 surface.

Figure 4:
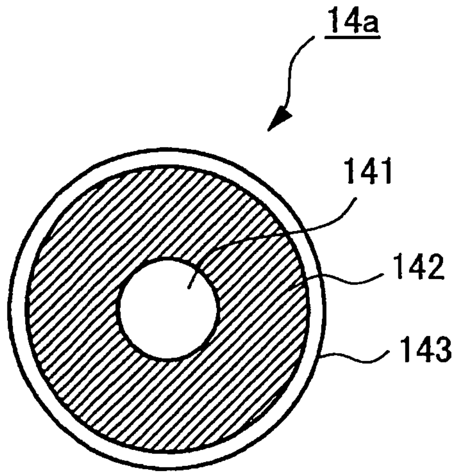
FIG. 4 is a cross-sectional view of the charging roller according to the invention.

FIG. 4 is a cross-sectional view of the charging roller according to the present invention. The charging roller 14*a* comprises the core metal 141 as a conductive support in the shape of a cylinder, the resistance adjustment layer 142 formed in uniform thickness on the peripheral surface of the core metal 141, and the protection layer 143 which covers the surface of the resistance adjustment layer 142 and prevents the leakage of the charge (which will be described later).

The resistance adjustment layer 142 is formed by preparing the resin composite on the peripheral surface of the core metal 141 by the extrusion or injection molding.

Moreover, the JIS-D hardness of the resistance adjustment layer 142 is made into 45 degrees or more, in order to prevent the gap between the photoconductor drum 11 and the charging roller 14*a* from changing, and to prevent the resistance adjustment layer 142 from being deformed with the elapsed time.

The thermoplastic resin may be used for the resistance adjustment layer 142. However, it is not limited to this example if the JIS-D hardness after the formation can be retained, and the general-purpose resins, such as polyethylene (PE), polypropylene (PP), polymethyl methacrylate (PMMA), polystyrene (PS), and its copolymers (AS, ABS, etc.), may be used instead. The fabricating operation becomes easy and it is desirable.

The resistance adjustment layer 142 is formed with the thermoplastic resin composite in which the macromolecule type ion electric conduction agent disperses. As for the volume resistivity value of this resistance adjustment layer 142, it is desirable that it is $10^6$-$10^9$ ohm-cm.

If the volume-resistivity value exceeds $10^9$ ohm-cm, the amount of charging runs short, the photoconductor drum 11 does not acquire the image without unevenness, and it becomes impossible to obtain sufficient charging electric potential.

If the volume-resistivity value is smaller than $10^6$ ohm-cm, the leakage of the charge to the whole photoconductor drum 11 will arise. As the macromolecule type ion electric conduction agent which is made to disperse in the thermoplastic resin, it is preferable to use the agent with which the resistance of the single component is about $10^6$-$10^{10}$ ohm-cm, and it is easy to lower the resistance of the resin.

As the example, the compound containing the polyether ester amide ingredients can be used. In order to make the resistance of the resistance adjustment layer 142 into the desired value as mentioned above, as for the amount of combination, it is desirable to blend at a rate of 30-70 weight parts to the base-material 100 weight parts.

Moreover, the 4th class ammonium salt including high molecular compound can also be used as a macromolecule type ion electric conduction agent. For example, the 4th class ammonium salt including polyolefine etc. can be used.

In order to make the resistance of the resistance adjustment layer 142 into the desired value as mentioned above, as for the amount of combination, it is desirable to blend at a rate of 10-40 weight parts to the base-material 100 weight parts.

Dispersion to the thermoplastic resin of the above-mentioned macromolecule type ion electric conduction agent can be easily performed by using the 2 shaft kneading machine, the kneader, etc.

Since the material of ion conductivity is uniformly dispersed on the molecule level in matrix polymer, in the resistance adjustment layer 142, dispersion in the resistance caused by poor dispersion of the conductive matter as in the resistance adjustment layer in which the conductive pigment disperses does not arise.

Moreover, since the material of ion conductivity is the high molecular compound, in the matrix polymer, it disperses uniformly and is fixed. Thus, the bleed out is hard to arise.

The protection layer 143 is formed so that the resistance thereof is larger than the resistance of the resistance adjustment layer 142, and thereby, the leaking to the defective part to the photoconductor drum 11 is avoided.

However, if the resistance of the protection layer 143 is made too high, the charging efficiency will fall, and as for the difference between the resistance of the protection layer 143 and the resistance of the resistance adjustment layer 142, it is desirable that it is $10^3$ ohm-cm or less.

As a material which forms the protection layer 143, the resin material is suitable because the film production nature is desirable.

It is desirable from the viewpoint in which the fluororesin, the polyamide resin, the polyester resin, or the polyvinyl acetal resin is excellent in non-tackiness, and prevents the adhesion of the toner as a resin material.

Moreover, since the resin material generally has the electric insulation, if it forms the protection layer 143 with the resin material simple substance, the characteristics of the charging roller will not be fulfilled.

Then, the resistance of the protection layer 143 is adjusted by distributing various kinds of electric conduction agents to the above-mentioned resin material.

In addition, in order to raise the adhesive property of the protection layer 143 and the resistance adjustment layer 142, it is possible to use the resin material disperse reaction curing agent, such as isocyanate.

The charging roller 14*a* is connected to the power source which is not illustrated, and the predetermined voltage is supplied.

As for the voltage supplied, it is possible that it is only the direct-current (DC) voltage. However, it is desirable that the voltage in which the alternating-current (AC) voltage is superimposed on the DC voltage is supplied.

By supplying the AC voltage, the photoconductor drum 11 surface can be charged more in homogeneity.

Next, the charging cleaning component 14*b* will be explained. The charging cleaning component 14*b* comprises the portion in contact with the charging roller 14*a*, and this portion is made of a resin foam having a continuous foam structure and has a density in the range of 5 to 15 kg/m3 and a tensile strength in a range of 1.7±0.5 kg/cm2.

Figure 5A:
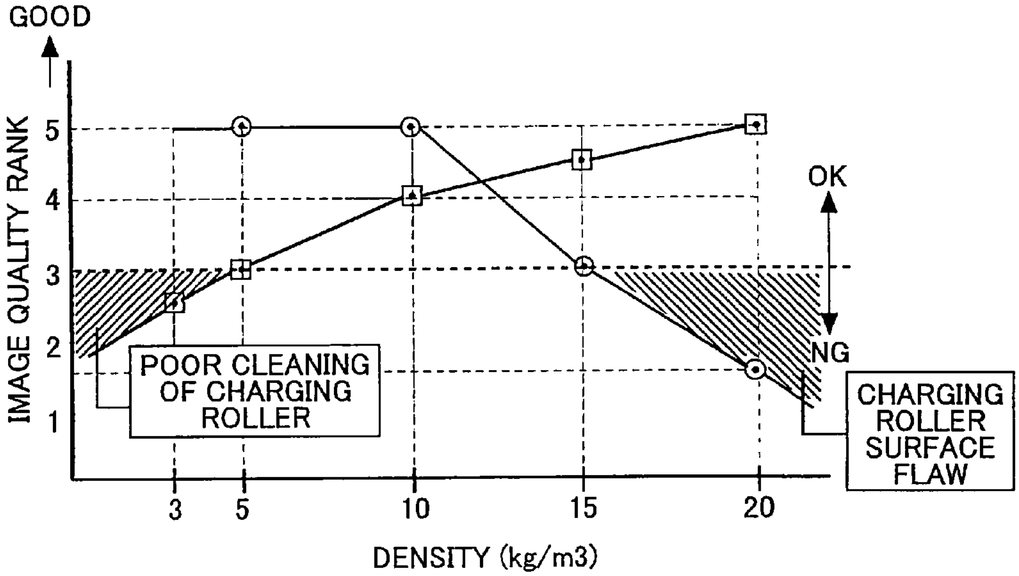
FIG. 5A is a diagram for explaining the relation between the value of the density of the resin foam, which constitutes the charging cleaning component, and the cleaning characteristic and surface flaw resistance of the charging roller surface.
Figure 5B:
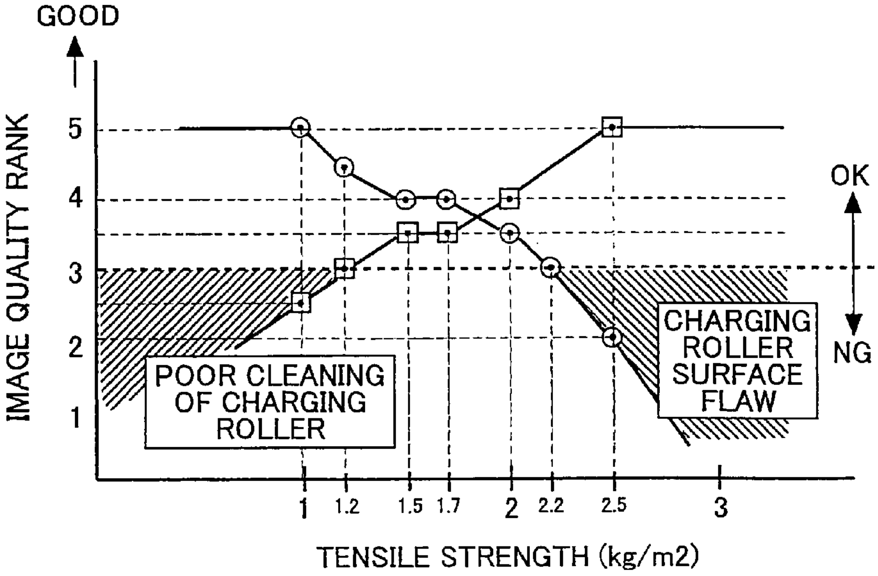
FIG. 5B is a diagram for explaining the relation between the value of the tensile strength of the resin foam, which constitutes the charging cleaning component, and the cleaning characteristic and surface flaw resistance of the charging roller surface.

FIG. 5A and FIG. 5B are the diagrams showing the relation between the cleaning characteristic of the value of the density of the resin foam which constitutes the charging cleaning component 14*b* and the tensile strength, and the charging roller 14*a* surface, and the surface flaw resistance.

By using the image quality rank of the image formed, each of the cleaning characteristic of the charging roller 14*a* surface and the surface flaw resistance can be estimated. Namely, if the cleaning performance of charging cleaning component 14*b* is inadequate and the stain has adhered to the charging roller 14*a* surface, desirable charging of the photoconductor drum 11 will not be performed, but the greasing will occur.

In FIG. 5A and FIG. 5B, the plot of "□" shows the relation with the greasing, and it is shown that there is no greasing as the image quality rank is higher, and there is more greasing as the image quality rank is lower.

Moreover, if the charging roller 14*a* surface is flawed by the friction of the charging cleaning component 14*b*, the stripe-like defect on the image occurs. In FIG. 5A and FIG. 5B, the plot of "O" shows the occurrence of the stripe-like defect and it is shown that there are few stripe-like defects when the image quality rank is higher and there are many stripe-like defects when the image quality rank is lower.

In addition, the highest image quality rank is 5.0, and the image quality rank required practically is 3.0 or more.

It is shown in FIG. 5A that when the density of the resin foam is 5 kg/$m^3$ or more, sufficient cleaning performance of the charging cleaning component 14*b* is obtained.

When the density is smaller than 5 kg/$m^3$, sufficient cleaning performance is not obtained, but poor charging occurs at an early stage. In such a case, the image defect, such as greasing, takes place.

On the other hand, when the density is larger than 15 kg/$m^3$, even if the cleaning performance is preferable, the amount of shaving of the charging roller 14*a* surface increases, and the crack occurs on the charging roller 14*a* surface at an early stage. In such a case, the image with the stripe-like defect is created.

It is shown in FIG. 5B that, when the tensile strength of the resin foam is 1.2 $kg/cm^2$ or more, sufficient cleaning performance of the charging cleaning component 14*b* is obtained.

When the tensile strength is less than 1.2 $kg/cm^2$, the strength is not enough, the resin foam will be damaged at an early stage, and adequate cleaning performance is not obtained.

On the other hand, when the tensile strength is larger than 2.2 $kg/cm^2$, even if the cleaning performance is preferable, the charging roller 14*a* surface is flawed at an early stage, and the image with the stripe-like defect is created.

Therefore, as the physical-property values of the resin foam which constitutes the charging cleaning component 14*b*, it is required that the density is in the range of 5-15 $kg/m^3$, and the tensile strength is in the range of 1.7±0.5 $kg/cm^2$.

The resin foam of the continuous foam structure which has the density in the above-mentioned range shows the state of the network of small pores, and can remove the adhering matters, such as the toner of the charging roller 14*a* surface, by the frame portion of the resin foam.

Moreover, the resin foam which has the tensile strength in the above-mentioned range shows the brittle characteristic and is easily separated with the frictional force received by the contact surface from the charging roller 14*a*.

Since the adhering matters, such as the toner retained in the pores of the resin foam, are also separated together at this time, and the stacking of the adhering matters in the pores of the resin foam as in the conventional resin foam does not take place. The charging roller surface can be maintained without surface flaw continuously over an extended period of time, and desirable cleaning performance can be obtained.

Furthermore, when the elongation percentage of the resin foam is in the range of 20-40%, the characteristics of the above-mentioned resin foam can be better demonstrated.

Among the resin foam materials which show the above-mentioned physical-properties values, the melamine resin foam is especially desirable. Since the network-like fiber is hard, the foam formed by the melamine resin removes the adhering matters on the charging roller 14*a* easily.

As the configuration of the charging cleaning component 14*b*, the putt configuration or the roller configuration may be sufficient. In the present embodiment, as shown in FIG. 2 and FIG. 3, it is made into the roller configuration.

The charging cleaning component 14*b* made into the roller configuration is rotatably attached, and the surface to be cleaned is always replaceable. Such a configuration can be formed by winding the melamine resin foam around the core metal in the shape of a cylinder.

Moreover, as for the melamine resin foam which constitutes the charging cleaning component 14*b*, it is desirable that heating compression is carried out to the compressibility of 30±15% from the original configuration in the radial direction. The compressibility is determined in accordance with the following formula (1):

$$\text{Compressibility}(\%)=\{(\text{diameter before compression}-\text{diameter after compression})/(\text{diameter before compression})\}\times 100 \quad (1)$$

The melamine resin foam which is created by the foaming of the melamine resin has dispersion in the expansion ratio, and has the surface in which a number of pinholes with the diameter of 1 to 3 mm exist.

Such existence of the pinhole reduces the contact area with the charging roller 14*a* which should be cleaned, generates poor cleaning partially, and becomes the cause of charging unevenness.

Then, by carrying out heating compression of the melamine resin foam in the above-mentioned compressibility range, a continuous foam structure can be made precise and the cleaning performance can be raised.

In addition, after carrying out heating compression of the melamine resin foam, the core metal is inserted and the contour is prepared by the polishing so that the charging cleaning component 14*b* is produced.

It is desirable that the charging cleaning component 14*b* is provided to exert pressure on the charging roller 14*a* by gravity. Since the charging cleaning component 14*b* is made of the above-mentioned resin foam, it is not necessary to apply pressure using a spring or the like. Since the charging cleaning component 14*b* contacts the charging roller 14*a* surface by its gravity, sufficient cleaning performance can be obtained. Thus, the charging cleaning component is provided such that abrasion of the charging roller 14*a* surface by the contact of the charging cleaning component 14*b* can be suppressed.

It is desirable that the charging cleaning component 14*b* is provided to be rotated with the rotation of the charging roller 14*a* in the direction of the arrow indicated in FIG. 3. Making the charging cleaning component 14*b* follow the rotation of the charging roller 14*a* allows the driving device for driving the charging cleaning component 14*b* to be made unnecessary, and the composition can be simplified.

Moreover, it is desirable that the charging cleaning component 14*b* is provided with the rocking mechanism (not shown) for rocking the charging cleaning component 14*b* in the longitudinal direction together with the rotation of the charging roller 14*a*.

For example, a bearing is arranged on the end of the shaft of the charging cleaning component 14*b*, it is brought in contact with the cam surface of the gear with the rocking cam. When the gear with the rocking cam is rotated with the rotation of the charging roller 14*a*, the rocking mechanism acts to rock the charging cleaning component 14*b* in the longitudinal direction according to the land and recess of the cam surface. Such rocking mechanism can be used.

Thus, with the use of the rocking mechanism, the charging cleaning component 14 can be rocked and cleaning of the charging roller 14*a* surface can be made uniform.

Since the paper chip in many cases takes place from the both ends of the recording paper, the position where the paper chip adheres to the photoconductor drum 11 is inclined, and the position where the paper chip adheres to the charging roller 14*a* surface is also inclined. To obviate the problem, the charging cleaning component 14*b* is provided to be rocked, and it is possible to suppress the biasing of the paper adhesion to the charging roller 14*a* and make the cleaning uniform.

The above-described charging device of the present invention can be supported by any arbitrary unit chosen from among the units including the photoconductor unit, the charging unit, the development unit and the cleaning unit, and can be used also for the process cartridge which is detachably arranged in the image-forming-apparatus body.

By having the charging roller which has the above-mentioned composition as an charging unit prepared in the process cartridge concerned, and the charging cleaning component, the charging roller surface can be cleaned preferable and the homogeneity of charging can be maintained.

Moreover, the cleaning performance of the charging roller is not spoiled until the life of the process cartridge comes.

The image forming apparatus of the present invention may be equipped with a lubricant application unit to apply the lubricant to the photoconductor drum 11 surface.

Figure 6:
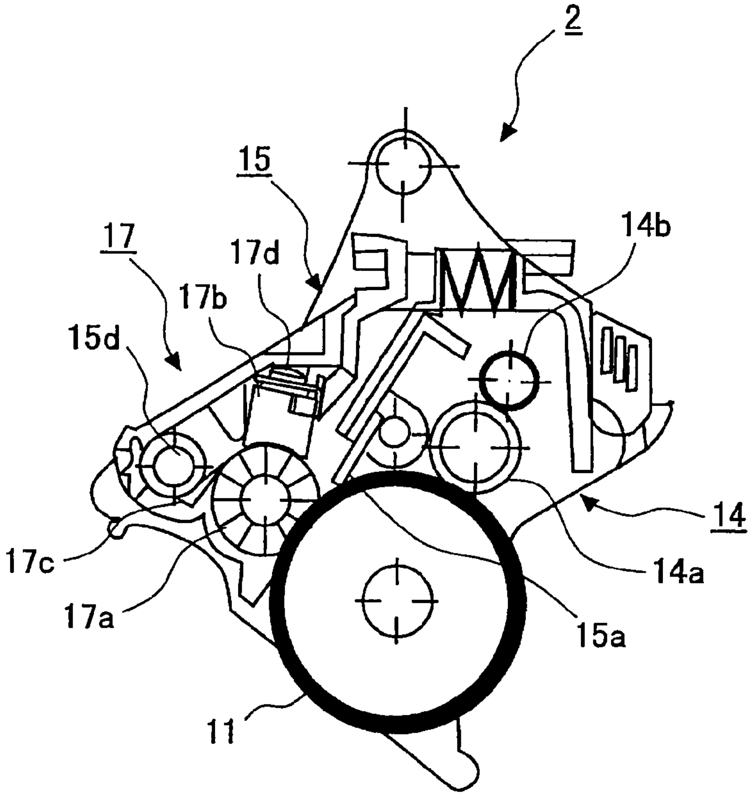
FIG. 6 is a diagram showing another composition of the photoconductor unit.

FIG. 6 is a diagram showing the composition of the photoconductor unit equipped with the lubricant application unit.

The composition of those other than the lubricant application unit 17 in FIG. 6 is the same as that of the photoconductor unit shown in FIG. 2.

The lubricant application unit 17 mainly comprises the solid lubricant 17*b*, the brush-like roller 17*a* which removes the lubricant by contacting the solid lubricant 17*b* and supplies the same to the surface of the photoconductor drum 11, the brush-like roller scraper 17*c* which removes the toner adhering to the brush-like roller 17*a*, and the pressure spring 17*d* which presses the solid lubricant 17*b* by the predetermined pressure to the brush-like roller 17*a*.

Examples of the solid lubricant 17*b* may include lead oleate, oleic acid zinc, copper oleate, zinc stearate, stearic acid cobalt, stearic acid iron, fatty acid metal salts, such as stearic acid copper, palmitic acid zinc, palmitic acid copper, and linolenic acid zinc, polytetrafluoroethylene, polychlorotrifluoroethylene resin, polyvinylidene fluoride, fluorine group resins, such as polytrifluorochloroethylene, dichlorodifluoro ethylene, tetrafluoroethylene ethylene copolymer, and tetrafluoroethyleneoxafluoro propylene copolymer can be used.

The brush-like roller 17*a* has the configuration prolonged in the shaft orientations of the photoconductor drum 11. The pressure spring 17*d* exerts pressure on the brush-like roller 17*a* so that the solid lubricant 17*b* can be used up completely.

Since the solid lubricant 17*b* is the consumable supplies, the thickness decreases with the elapsed time. Since it is pressurized by the pressure spring 17*d*, it is always in contact with the brush-like roller 17*a*. Thus, the solid lubricant 17*b* is scratched and supplied to the photoconductor drum 11.

The brush-like roller 17*a* serves as the cleaning brush and functions to move the toner which remains after the scratching of the cleaning-blade 15*a*, to the toner conveyance unit 15*d*.

The lubricant application unit 17 is not limited to the above-mentioned composition. Alternatively, the solid lubricant 17*b* may be made to contact the photoconductor drum 11 surface directly. Or the composition which supplies the fine-particles-like lubricant to the photoconductor drum 11 surface may be used.

Thus, the roughness of the photoconductor drum 11 surface produced when the voltage which the thin layer of the lubricant could be formed in the photoconductor drum 11 surface, for example, made AC voltage superimpose on DC voltage as an charging voltage is supplied can be prevented by preparing an unit to apply the lubricant in the photoconductor drum 11 surface.

The coefficient of friction of the photoconductor drum 11 surface can be reduced, the adhesion force of the photoconductor drum 11 surface and the toner can be weakened, and the transfer nature of the developed toner can be raised.

The external additive grain with the silica hard, for example etc. which is separated from the toner in the thin layer of the lubricant prepared in the photoconductor drum 11 surface was easy to be caught, when passing through the contact side of the cleaning blade, blade edge was damaged, and it had also become the cause of generating the chip of the blade, and abrasion.

If the abrasion of the cleaning blade progresses by the time, the amount of toner which passes through the blade will also increase, and the surface contamination of the charging roller 14*a* gets worse.

However, in the charging device 14 carried on the image forming apparatus of the invention, the suitable cleaning is performed by the charging cleaning component 14*b* continuously over an extended period of time, and the charging roller 14*a* surface is always in the clean state and does not produce charging unevenness etc.

In the image forming apparatus of the present invention, the toner used by the developing device 10 has the volume mean particle diameter in the range of 3-8 micrometers. It is desirable that the toner has the narrow particle size distribution such that the diameters of the toner particles have the ratio (Dv/Dn) of the volume mean particle diameter (Dv) and the number mean particle diameter (Dn) in the range of 1.00-1.40.

The toner can be made to adhere precisely to the latent image by using the toner with the diameter of the particles.

By narrowing the particle size distribution, the amount distribution of charging of the toner becomes uniform, and can acquire the high-definition image with little natural complexion fogging.

Moreover, the rate of the transfer can be made high. Since the amount of the reverse charging toner can also be reduced contamination of the charging roller 14*a* surface it can decrease charging cleaning the component the life of 14*b* can be prolonged.

As for the toner used by the developing device 10, it is desirable that the toner has the particle configuration which is specified with the following shape factors SF-1 and SF-2.

Figure 7A:
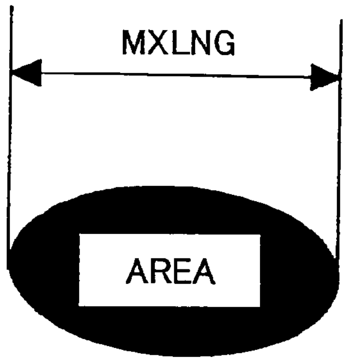
FIG. 7A and FIG. 7B are diagrams showing the typical configuration of the toner for explaining the shape factor SF-1 and the shape factor SF-2.
Figure 7B:

FIG. 7A and FIG. 7B are the diagrams showing the typical configuration of the toner for explaining the shape factor SF-1 and the shape factor SF-2.

The shape factor SF-1 is the value which shows the rate of the roundness of the toner configuration. The shape factor SF-1 is determined in accordance with the following formula (2) where MXLNG is the maximum length of the configuration in which the toner particle is projected on the 2-dimensional flat surface and AREA is the area of the figure.

$$SF\text{-}1=\{(MXLNG)^2/AREA\}\times(100\pi/4) \quad (2)$$

When the value of SF-1 is 100, the configuration of the toner particle is the true sphere. When the value of SF-1 is larger than 100, the configuration of the toner particle becomes the infinite form.

The shape factor SF-2 is the value which shows the rate of the irregularity of the toner configuration. The shape factor SF-2 is determined in accordance with the following formula (3), where PERI is the circumference of the figure in which in which the toner particle is projected on the 2-dimensional flat surface, and AREA is the area of the figure.

$$SF\text{-}2=\{(PERI)^2/AREA\}\times(100/4\pi) \quad (3)$$

When the value of SF-2 is 100, the irregularity stops existing in the toner surface. When the value of SF-2 is larger than 100, the irregularity on the surface of the toner becomes remarkable.

The measurement of the shape factor is performed by taking the photograph of the toner by the scanning electron microscope (S-800 from Hitachi Co.). The measurement data is inputted to the image-analysis device (LUSEX3 from Nireko Co.) so that the analysis and calculation is carried out.

The toner according to the present invention should be the toner which has a SF-1 in a range of 100-180, and has a SF-2 in a range of 100-180.

If the configuration of the toner becomes the spherical form closely, since contact to the toner, the toner or the toner, and the photoconductor drum 11 will turn into the point contact closely, the adsorption power of the toners becomes weak, therefore flowability becomes high.

Moreover, the adhesion force of the toner to the photoconductor drum 11 surface also declines, and the rate of the transfer becomes high.

On the other hand, since the spherical form toner tends to enter the gap between the cleaning-blade 15*a* and the photoconductor drum 11, as for the shape factors SF-1 and SF-2 of the toner, it is desirable that they are 100 or more.

Moreover, if SF-1 and SF-2 become too large, the toner on the image will break up and the image quality will fall. For this reason, it is more desirable for SF-1 and SF-2 not to exceed 180.

The toner used suitable for the image forming apparatus of the present invention is the toner which is obtained by making the bridging and/or elongation reaction in the aqueous solution of the toner material liquid in which the polyester prepolymer which has the functional group containing nitrogen atom etc., the polyester, the colorant, and the mold lubricant are distributed in the organic solvent.

Next, the construction material and the manufacture method of the toner will be explained.

(Denaturation Polyester)

The toner concerning the present invention contains the denaturation polyester (i) as a binder resin. As the denaturation polyester (i), the copolymers other than the ester bond exist in the polyester resin, and the resin ingredients from which composition differs puts the state where it bonded together by the covalent bond, the ionic bond, etc., into the polyester resin.

Specifically, the functional group, such as the isocyanate group, which reacts with the carboxylic acid group and the hydroxyl group, is added to the polyester end, and it is made to react further to it with the active hydrogen content compound, so that the polyester end is denaturalized.

As the denaturation polyester (i), the urea denaturation polyester which is obtained according to the reaction of the polyester prepolymer (A) having the isocyanate group, and the amine (B) may be used.

The material to which the polyester which is the polycondensation object of the polyhydric alcohol (PO) and polyhydric carboxylic acid (PC), and has the active hydrogen group as a polyester prepolymer (A) which has the isocyanate group was made to react with the polyhydric isocyanate compound (PIC) further can be used.

As an active hydrogen group which the above-mentioned polyester has, the hydroxyl group (the alcohol nature hydroxyl group and phenol nature hydroxyl group), the amino group, the carboxyl group, the sulfhydryl group, etc. may be used, and the material desirable among these is the alcohol nature hydroxyl group.

The urea denaturation polyester is created as follows. As the polyhydric alcohol compound (PO), the divalent alcohol (DIO) and the polyhydric alcohol more than trivalence (TO) may be used, and the mixture with (TO) or (DIO), the independence (DIO), and little is desirable.

As the divalent alcohol (DIO), alkylene glycol (ethylene glycol, 1,2-propylene glycol, 1,3-propylene glycol, 1,4-butanediol, 1,6-hexane diol, etc.); alkylene ether glycol (diethylene glycol, triethylene glycol, dipropylene glycol, polyethylene glycol, polypropylene glycol, polytetramethylene ether glycol, etc.); alicyclic diols (1,4-cyclohexane-dimethanol, hydrogenation bisphenol A, etc.); bisphenol group (bisphenol A, bisphenol F, bisphenol S, etc.), the alkylene oxide of the alicyclic diol and its addition products (ethyleneoxide, propylene oxide, butylene oxide); and the alkylene oxide of the addition products of the bisphenol (ethyleneoxide, propylene oxide, butylene oxide, etc.) can be used.

The material desirable among these is the alkylene oxide addition product of the alkylene glycol having the carbon number of 2-12, and the bisphenol. Especially the desirable material is the material combined with the alkylene oxide addition product of the bisphenol and the alkylene glycol having the carbon number of 2-12.

As the polyhydric alcohol more than trivalence (TO), the alkylene oxide addition product of the polyphenol, the trivalent or more phenols (trisphenol PA, phenol novolak, cresol novolak, etc.); the above-mentioned trivalence or the polyhydric aliphatic alcohol (glycerol, trimethylolethane, trimethylol-propane, pentaerythritol, sorbitol, etc.); trivalence beyond it etc. can be used.

As the polyhydric carboxylic acid (PC), the divalent carboxylic acid (DIC) and the polyhydric carboxylic acid more than trivalence (TC) may be used, and the mixture with (TC) and (DIC), the independence (DIC), and little is desirable.

As the divalent carboxylic acid (DIC), alkylene dicarboxylic acid (succinic acid, adipic acid, sebacic acid, etc.); alkenylene dicarboxylic acid (maleic acid, fumaric acid, etc.); aromatic dicarboxylic acids (phthalic acid, isophthalic acid, terephthalic acid, naphthalene dicarboxylic acid, etc.) etc. may be used.

The materials desirable among these are the alkenylene dicarboxylic acid having the carbon number of 4-20, and the aromatic dicarboxylic acid having the carbon number of 8-20. As the polyhydric carboxylic acid more than trivalence (TC), the aromatic polyhydric carboxylic acid (trimellitic acid, pyromellitic acid, etc.) having the carbon number of 9-20 etc. can be used. In addition, it is possible to make it react with the polyhydric alcohol (PO) as polyhydric carboxylic acid (PC) using the above-mentioned acid anhydride or low-grade alkyl ester of the above-mentioned material (methyl ester, ethyl ester, isopropyl ester, etc.).

The ratio of the polyhydric alcohol (PO) and the polyhydric carboxylic acid (PC) as the equivalent ratio [OH]/[COOH] of the hydroxyl group [OH] and the carboxyl group [COOH] is usually in the range of 2/1-1/1. It is desirably in the range of 1.5/1-1/1, and more desirably in the range of 1.3/1-1.02/1.

The denaturation polyester (i) used by the present invention is manufactured by the one-shot process and the prepolymer method. The weight average molecular weight of denaturation polyester (i) is usually 10,000 or more. It is 20,000-10 million preferably. It is 30,000-1 million still more preferably.

As for the peak molecular weight at this time, 1000-10000 are desirable, less than by 1000, that it is hard to carry out the elongation reaction, there is little elasticity of the toner and, as a result, hot-proof offset nature gets worse.

If the peak molecular weight at this time exceeds 10000, in the fall of fixing nature, or grinding, the subject on manufacture will become high. The number average molecular weight of the denaturation polyester (i) is preferable at the number average molecular weight which is easy to obtain although it is not limited especially when using the polyester (ii) which is not denaturalizing, and considered as the weight average molecular weight.

(i) When independent, the number average molecular weight is usually 20000 or less. It is 1000-10000 preferably. It is 2000-8000 still more preferably.

If 20000 is exceeded, the glossiness at the time of using for low-temperature fixing nature and the full color device will get worse. The molecular weight of the urea denaturation polyester obtained using the reaction stop agent as occasion demands can be adjusted to the bridging formation and/or the elongation reaction of the polyester prepolymer (A) and the amine (B) for obtaining denaturation polyester (i).

As a reaction stop agent, the monoamines (diethylamine, dibutylamine, butylyamine, laurylamine, etc.), and the material (ketimine compound) which blocks reaction may be used.

(Non-Denatured Polyester)

The non-denatured polyester (ii) can also be made to contain as a binder resin ingredients in the present invention not only with the polyester (i) independent use which denaturalized but with the polyester (i).

By using (ii) together, the glossiness at the time of using for low-temperature fixing nature and the full color device improves, and it is more desirable than independent use.

As the (ii), the polycondensation object of the same polyhydric alcohol (PO) as the polyester ingredients of (i) and polyhydric carboxylic acid (PC) etc. can be used. The desirable material is the same as that of (i).

Moreover, (ii) may be denaturalized not only by the non-denatured polyester but by the chemical bonds other than the urea bond. For example, it is possible to be denaturalizing by the urethane bond.

As for (i) and (ii), it is desirable that at least the part is mutually soluble in respect of low-temperature fixing nature and hot-proof offset nature. Therefore, the polyester ingredients of (i) and (ii) have similar desirable composition. The weight ratio of (i) and (ii) in the case of making (ii) contain is usually 5/95-80/20. It is 5/95-30/70 preferably. It is 5/95-25/75 still more preferably. It is 7/93-20/80 most suitably.

At the ratio of less than 5%, the weight ratio of (i) becomes disadvantageous in respect of coexistence of the heat-resistant keeping quality and low-temperature fixing nature, while hot-proof offset nature gets worse. The peak molecular weight of (ii) is usually 1000-10000. It is 2000-8000 preferably. It is 2000-5000 still more preferably.

Less than by 1000, the heat-resistant keeping quality gets worse, and if 10000 is exceeded, low-temperature fixing nature will get worse.

As for the hydroxyl value of (ii), it is desirable that it is five or more. It is 10-120 still more preferably. It is 20-80 especially preferably. It becomes disadvantageous less than by five in respect of coexistence of the heat-resistant keeping quality and low-temperature fixing nature.

As for the acid number of (ii), 1-5 are desirable. It is 2-4 more preferably. In order to use the high acid number wax for the wax, since the low acid number binder is connected with charging or high volume resistivity, the binder tends to match the toner used for the binary group developer. The glass transition point (Tg) of the binder resin is usually 35-70 degrees C. It is 55-65 degrees C. preferably.

The heat-resistant keeping quality of the toner gets worse at less than 35 degrees C. If it exceeds 70 degrees C., low-temperature fixing nature will become inadequate.

Since the urea denaturation polyester tends to exist in the surface of the toner parent grain obtained, even if the glass transition point is low, in the toner of the present invention, the heat-resistant keeping quality shows the preferable inclination as compared with the well-known polyester group toner.

(Colorant)

As the colorant, all of the well-known color and the pigment can be used. For example, the inorganic pigment used may include titanium oxide, iron oxide, and further include the carbon black which is manufactured by using the well-known methods, such as the contacting method, the furnace method, and the thermal method. Moreover, the examples of the organic pigment used may include the azo pigments (for example, azo lake, insoluble azo pigment, condensation azo pigment, chelate azo pigment, etc.), the multi-ring type pigments (for example, phthalocyanine pigment, perylene pigment, perynone pigment, anthraquinone pigment, quinacridone pigment, dioxazine pigment, thioindigo pigment, iso indolinone pigment, quinophtharone pigment, etc.), the dye chelates (for example, the basic dye type chelate, the acid dye type chelate, etc.), the nitro pigments, the nitroso pigments, the aniline black, etc. The examples of the black pigment used may include the carbon black (C. I. pigment black 7), such as the furnace black, the lamp black, the acetylene black, and the channel black, the metals, such as copper, iron (C. I. pigment black 11), and titanium oxide, and the organic pigments, such as the aniline black (C. I. pigment black 1). Moreover, the examples of the color pigments may include the C.I. pigment yellow 1 (First yellow G), 3, 12 (Diarylide yellow YT 553D), 13, 14, 17, 24, 34, 35, 37, 42 (yellow iron oxide), 53, 55, 81, 83 (Permanent yellow HR), 95, 97, 98, 100, 101, 104, 408, 109, 110, 117, 120, 138, 153, the C.I. pigment oranges 5, 13, 16, 17, 36, 43, 51, the C.I. pigment red 1, 2, 3, 5, 17, 22 (Brilliant first Scarlett), 23, 31, 38, 48:2 (Permanent red 2B (Ba)), 48:2 (Permanent red 2B (calcium)) 48:3 (Permanent red 2B (Sr)), 48:4 (permanent red 2B (Mn)), 49:1, 52:2, 53:1, 57:1 (Brilliant Carmine 6B), 60:1, 63:1, 63:2, 64:1, 81 (Rhodamine 6G lake), 83, 88, 101 (Iron oxide red), 104, 105, 106, 108 (Cadmium red), 112, 114, 122 (quinacridone magenta), 123, 146, 149, 166, 168, 170, 172, 177, 178, 179, 185, 190, 193, 209, 219, the C.I. pigment violet 1 (Rhodamine lake), 3, 5:1, 16, 19, 23, 38, the C.I. pigment blue 1, 2, 15 (Phthalocyanine blue R), 15:1, 15:2, 15:3 (Phthalocyanine blue E), 16, 17:1, 56, 60, 63, the C.I. pigment greens 1, 4, 7, 8, 10, 17, 18, 36, and those mixtures can be used.

The content of the colorant is usually the 1-15% of the weight to the toner. It is the 3-10% of the weight preferably.

The colorant can also be used as the resin and a composite masterbatch. As a binder resin which it mulls with manufacture of the masterbatch, or the masterbatch, styrene, such as polystyrene, poly-p-chlorostyrene, and polyvinyl toluene, and polymers of substitution product, or the copolymers and vinyl-polymers compound, polymethylmethacrylate, polybutyl meta-chestnut rate, polyvinyl chloride, the polyvinyl acetate, polyethylene, polypropylene, polyester, epoxy resin, epoxy polyol resin, polyurethane, polyamide, polyvinyl butyral, polyacrylic resin, rosin, denaturation rosin, the terpene resin, the aliphatic series or the aliphic hydrocarbon resin, the aromatic group petroleum resin, the chlorinated paraffin, the paraffine wax, etc. may be used independently or in combination.

(Charge Control Agent)

The material well-known as a charge control agent can be used, for example, they are the simple substance of the simple substance of the nigrosine group color, the triphenylmethane-color group color, the chromium content metal-complex color, the molybdic acid chelate pigment, the rhodamine group color, alkoxy group amine, the 4th class ammonium salt (the 4th class ammonium salt of fluorine denaturation is included), alkyl amide, and phosphorus or the compound, and the tungsten or the compound, the fluorine group activator, the salicylic acid metal salt. Specifically, "bontoron P-51" of the 4th class ammonium salt, "bontoron 03" of the Nigrosine group color, "bontoron S-34" of the metal-including azo dye, E-82 of the oxy-naphthoic acid group metal complex, E-84 of the salicylic acid group metal complex, and E-89 of the phenol group condensate (from "oriento" chemical industry Co.), TP-415 and TP-302 of the 4th class ammonium-salt molybdenum complex (from "hodogaya" chemical Co.), "copy charge PSY VP2038" of the 4th class ammonium salt, "copy blue PR" of the triphenylmethane-color derivative, "copy charge NEG VP2036" and "copy charge NXVP434" of the 4th class ammonium salt (from Hoechst A.G.), the compound of the macromolecule group which has the functional groups, LRA-901, LR-147 (from Japan Carlit Co.) that are the boron complex, the copper phthalocyanine, the perylene, the Quinacridone, the azo group pigment, the other sulfonic acid groups, the carboxyl group, and the 4th class ammonium salt, can be used.

Among these, the matter which controls especially the toner to the negative polarity is used preferably.

Although the amount of the charge control agent used is not determined by the toner manufacture method including the kind of binder resin, the existence of the additive used if needed, and the distributed method and is not limited uniquely, it is preferably used in the range of 0.1-10 weight parts to the binder resin 100 weight parts. Moreover, the range of 0.2-5 weight parts is most suitable.

In exceeding 10 weight parts, the charging nature of the toner is too large, and the effectiveness of the charge control agent is made to decline, the static electricity-suction force with the developing roller increases, and it causes the fluid fall of the developer, and the fall of image concentration.

(Mold Lubricant)

The effect is taken to the elevated-temperature offset without the wax of the low fusing point which is 50-120 degrees C. working between the fixing roller and the toner interface effectively as a mold lubricant more in dispersion with the binder resin, and the fusing point applying the mold lubricant like the oil to the fixing roller by this as a mold lubricant.

The following may be used as such wax ingredients. The waxes mineral group waxes, such as animal group waxes, such as vegetable group waxes, such as the carnauba wax, the cotton wax, the tree wax, and the rice wax, the bee wax, and the lanolin, the ozokerite, and the selsyn, and petroleum waxes, such as paraffin, the micro crystalline, and the petrolatum, etc. may be used. Moreover, the synthetic waxes, such as synthetic hydrocarbon waxes, such as the polyethylene wax, the ester, the ketone, and the ether, etc. may be used out of these natural wax. The crystalline polymer which has the long alkyl group can use for the side chain the gay polymer or the copolymers of the polyacrylate etc. which are fatty acid amide, such as 12-hydroxy stearic acid amide, stearic acid amide, the anhydrous phthalic imide, and the chlorinated hydrocarbon, and the crystalline-polymer resin of the low molecular weight, such as the poly n-stearyl metacrylate and the poly n-lauryl metacrylate. Smelting mulling of the charge control agent and the mold lubricant can also be carried out with the masterbatch and the binder resin, and in case it dissolves and disperses to the organic solvent, of course, it is possible to add them.

(External Additive)

The non-subtlety grain is preferably used as an external additive for assisting the flowability of the toner grain, development nature, and charging nature. As for the diameter of the primary particle of this non-subtlety grain, it is desirable that it is $5\times10^{-3}$ to 2 micrometers. It is especially desirable that it is $5\times10^{-3}$ to 0.5 micrometers.

As for the specific surface area by the BET adsorption method, it is desirable that it is 20-500 m2/g. As for the operating rate of this non-subtlety grain, it is desirable that it is 0.01-5 wt % of the toner. It is especially desirable that it is 0.01-2.0 wt %.

As an example of the non-subtlety grain, the silica, the alumina, the titanium oxide, the barium titanate, titanic acid magnesium, titanic acid calcium, the strontium titanate, the zinc oxide, the tin oxide, the quartz sand, the clay, the mica, the Kay welded pyroclastic rock, the diatom earth, the chrome oxide, the cerium oxide, the red ocher, the antimony trioxide, the magnesium oxide, the zirconium oxide, the barium sulfate, the barium carbonate, the calcium carbonate, the silicon carbide, the silicon nitride, etc. can be mentioned.

Especially, as the flowability agent, it is desirable to use together the hydrophobic silica particle and the hydrophobic titanium-oxide particle. When the mean particle diameter of both particles performs stirring mixture especially using the material of $5\times10^{-2}$ or less micrometers, the electrostatic force with the toner and the van der Waals force are increased remarkably.

Suitable image quality is obtained by the stirring mixture inside the developing device performed by this in order to obtain the desired charging level, without the flowability agent separated from the toner. Therefore, reduction of the transfer remaining toner is achieved.

The titanium-oxide particle is excellent in environmental stability and image concentration stability. However, it is in the aggravation inclination of charging standup characteristics. If the titanium-oxide particle addition increases more than the silica particle addition, the influence of this side reaction will become large.

However, in the range whose addition of the hydrophobic silica particle and the hydrophobic titanium-oxide particle is 0.3-1.5 wt %, charging standup characteristics are not spoiled greatly but desired charging standup characteristics are acquired. That is, even if it performs the repeat of the copy, the stable image quality is obtained.

Next, the manufacture method of the toner will be explained. Although the preferred embodiments of the manufacture method will be shown, the invention is not restricted to the embodiments.

(Manufacture Method of Toner)

1) The colorant, the non-denatured polyester, the polyester prepolymer that has the isocyanate group, and the mold lubricant are distributed in the organic solvent, and toner material liquid is made.

As for the organic solvent, it is desirable that the boiling point is the volatility of less than 100 degrees C. from the point that the removal after toner parent grain formation is easy.

Specifically, independent in the toluene, the xylene, the benzene, the carbon tetrachloride, the methylene chloride, 1,2-dichloroethane, 1 and 1,2-trichloroethane, trichloroethylene, chloroform, monochlorobenzene, dichloroethylidene, methyl acetate, ethyl acetate, methyl ethyl ketone, methyl isobutyl ketone, etc. or the two or more sorts in combination can be used.

Especially, the halogenated hydrocarbons, such as aromatic group solvents, such as the toluene and the xylene, and the methylene chloride, 1,2-dichloroethane, the chloroform, and the carbon tetrachloride, are desirable. the amount of the organic solvent used the polyester prepolymer 100 weight parts receiving usually the 0-300 weight parts desirable the 0-100 weight parts it is 25-70 weight parts still more preferably.

2) Toner material liquid is made to emulsify under existence of the surface active agent and the resin particle and in the aqueous medium.

The water independent is sufficient as the aquaous medium, and it may contain the organic solvents, such as the alcohols (the methanol, isopropyl alcohol, ethylene glycol, etc.), the dimethylformamide, the tetrahydrofuran, the cellosolves (methyl cellosolve etc.), and low-grade ketone (acetone, methyl ethyl ketone, etc.).

The amount of the aquaous medium used to the toner material liquid 100 weight parts is usually the 50-2000 weight parts. It is the 100-1000 weight parts preferably.

If it is below 50 weight parts, the distributed state of toner material liquid is bad, and the toner grain of the predetermined grain size is not obtained. It is not economical if 20000 weight parts are exceeded.

Moreover, in order to make dispersion in the aqueous medium preferable, the dispersants, such as the surface active agent and the resin particle, are added suitably. Any of the anionic or nonionic surface active agent, any agent may be used without limiting the kind of the surface active agent. The examples of the anionic surface active agent used may include polyoxyethylene alkyl ether acetate, dodecylbenzene sulfonate, lauric acid salt, polyoxyethylene alkyl ether sulfate, etc. The examples of the nonionic surface active agent may include polyoxyethylene alkyl ether, polyoxyethylene alkyl ester, polyoxyethylene sorbitan fatty acid ester, polyoxyethylene alkylphenyl ether, polyoxyethylene alkyl amine, polyoxyethylene alkyl amide, etc. One of the above examples of the surface active agents may be used solely or two or more among them may be mixed in combination.

Moreover, by using the surface active agent which has the fluoro alkyl group, the effectiveness can be obtained with a small amount of the surface active agent used.

The anionic surface active agent which has the fluoro alkyl group can be used preferably. As the tradename, "sahfurin" S-111, S-112, S-113 (from Asahi Glass Co.), "furorando" FC-93, FC-95, FC-98, FC-129 (from Sumitomo 3 M Co.), "yunidain" DS-101, DS-102 (from "daikin kogyo" Co.), "megafakku" F-110, F-120, F-113, F-191, F-812, and F-833 (from "dainippon ink" Co.), "ekutoppu" EF-102, 103, 104, 105, 112, 123A, 123B, 306A, 501, 201 and 204 (from "tohkemu" products Co.), "futahzyento" F-100, F150 (from "neosu" Co.), etc. may be used.

Moreover, the nonionic surface active agent which has the fluoro alkyl group can be used preferably. As the tradename, "sahhuron" S-121 (from Asahi Glass Co.), "furorando" FC-135 (from "sumitomo 3M" Co.), "yunidain" DS-202 (from "daikin kogyo" Co.), "megafakku" F-150, F-824 (from "dainippon" Ink Co.), "ekutoppu" EF-132 (from "tohkemu" products Co.), "hutahzyento" F-300 (from "neosu" Co.), etc. may be used.

As long as the resin particle is the resin which can form the water dispersing element, it can use any resins and the thermoplastic resin or the thermosetting resin is sufficient as it. For example, the vinyl-polymers group resin, the polyurethane resin, the epoxy resin, the polyester resin, the polyamide resin, the polyimide resin, the silicon group resin, the phenol resin, the melamine resin, the urea resin, the aniline resin, the ionomer resin, the polycarbonate resin, etc. may be used.

It does not interfere, even if it uses together the two or more sorts of above-mentioned resins as a resin. Among these, the vinyl-polymers group resin from the point that the water dispersing element of the detailed spherical resin grain is easy to be obtained, the polyurethane resin, the epoxy resin, the polyester resins, and those combined use of desirable one are desirable.

As a vinyl-polymer group resin, in the vinyl-polymers group monomer, it is homopolymerization and the polymer which carried out copolymerization, for example, the resins, such as styrene (meta) acrylic-ester copolymer, styrene butadiene copolymer, acrylic acid (meta)-acrylic-ester polymer, styrene acrylonitrile copolymer, styrene maleic anhydride copolymer, and styrene (meta) acrylic acid copolymer, may be used. The mean particle diameter of the resin particle is usually 5-200 nm. It is 20-300 nm preferably.

Moreover, the inorganic compound dispersant, such as phosphoric acid tricalcium, calcium carbonate, titanium oxide, colloidal silica, and hydroxyapatite, can also be used.

It may use together with the above-mentioned resin particle and the inorganic compound dispersant, and the distributed droplet may be stabilized by macromolecule group protective colloid as a dispersant which can be used.

For example, acids, such as acrylic acid, methacrylic acid, alpha-cyano acrylic acid, alpha-cyano methacrylic acid, itaconic acid, crotonic acid, butenedioic acid, maleic acid, or maleic anhydride, acrylic (meta) group monomer containing hydroxyl group, acrylic acid-beta-hydroxy ethyl, methacrylic acid-beta-hydroxy ethyl, acrylic acid-beta-hydroxy compound, methacrylic acid-beta-hydroxy propyl, acrylic acid-gamma-hydroxy propyl, methacrylic acid-gamma-hydroxy propyl, acrylic acid-3-chloro-2-hydroxy compound, methacrylic acid-3-chloro-2-hydroxy propyl, diethylene glycol monochrome acrylic ester, diethylene glycol monochrome methacrylic ester, glycerol monochrome acrylic ester, glycerol monochrome methacrylic ester, N-hydroxymethylacryl amide, vinyl alcohol ether, such as N-hydroxymethylmethacryl amide, or vinyl alcohol may be used.

For example, the vinyl-polymers methyl ether, vinyl-polymers ethyl ether, vinyl-polymers propyl ether, etc., or the ester of the compound containing the vinyl alcohol and the carboxyl group, the acrylamides, such as the vinyl acetate, propionic acid vinyl polymers, and butyric acid vinyl polymers, metacryl amide, diaceton acrylamides, or the methylol compounds, the acid chloride, such as acrylic acid chloride, methacrylic acid chloride, the nitrogen including compounds, such as vinylpyridine, vinyl pyrrolidone, vinyl-polymers imidazole, and the ethyleneimine, or the homopolymer or the copolymers, such as those having heterocycle, polyoxyethylene, polyoxypropylene, polyoxyethylene alkylamine, polyoxypropylene alkylamine, polyoxyethylene alkyl amide, polyoxypropylene alkyl amide, the polyoxyethylene nonyl phenyl ether, polyoxyethylene laurylphenyl ether, polyoxyethylene stearylphenyl ester, cellulose, such as polyoxyethylene groups, such as polyoxyethylene nonyl phenyl ester, methyl cellulose, hydroxyethyl cellulose, and hydroxy propyl cellulose, can be used.

It is not limited especially as the method of dispersion. The known equipment of the low-speed shearing type, the high-speed shearing type, the friction type, the high-pressure jet type, the supersonic wave, etc. is applicable.

Also, in this respect, in order to set the grain size of the dispersing element to 2-20 micrometers, the high-speed shearing type is desirable.

Although especially limitation does not have rotational frequency when the high-speed shearing type disperser is used, it is usually 5000-20000 rpm preferably 1000 to 30000 rpm.

Although especially limitation does not have distributed time, in the case of the batch type, it is usually the 0.1-5 minutes. As temperature at the time of dispersion, it is usually in the range of 0-150 degrees C. (under pressure) and more desirably it is in the range of 40-98 degrees C.

3) The amine (B) is added and the reaction with the polyester prepolymer (A) which has the isocyanate group is made to perform simultaneously with production of emulsification liquid. This reaction is accompanied by bridging formation and/or elongation of the chain.

Although reaction time is chosen by the reactivity of the isocyanate group configuration and amine (B) which the polyester prepolymer (A) has, it is usually 2—the 24 hours preferably for the 10 minutes to the 40 hours.

0-150 degrees C. of reaction temperature are usually 40-98 degrees C. preferably.

Moreover, the known catalyst can be used if needed. Specifically, the dibutyltinlaurylate, the dioctyltinlaurylate, etc. may be used.

4) The organic solvent is removed from the emulsification dispersing element (reactant) after the reaction end, it washes and dries and the toner parent grain is obtained.

In order to remove the organic solvent, after heating the whole group in the state of stirring of the laminar flow gradually and giving strong stirring in the fixed temperature region, the toner parent grain spindle-formed by performing the solvent removal is producible.

Moreover, when the acids, such as the calcium phosphate salt, and the object which can dissolve in the alkali are used as a distributed stabilizer, the calcium phosphate salt is removed from the toner parent grain by the method of rinsing with the acids, such as the hydrochloric acid, after dissolving the calcium phosphate salt. In addition, it is removable with operation of decomposition by the enzyme etc.

5) The charge control agent is driven into the toner parent grain obtained above if needed, subsequently, non-subtlety grains, such as the silica particle and the titanium-oxide particle, are made to the addition, and the toner is obtained.

The addition is performed outside placing of the charge control agent and the non-subtlety grain by the well-known method which used the mixer etc. Thereby, it is the diameter of the particles and the sharp toner of the particle size distribution can be obtained easily.

Furthermore, the material for which strong stirring is given at the process which removes the organic solvent true since spherical, the configuration between the shape of a Rugby ball can be controlled, and surface mole follow G can also be further controlled between pickled plum configurations from the smooth material.

Moreover, the configuration of the toner concerning the present invention is in a generally spherical configuration, and the following configuration regulations can express it.

Figure 8A:
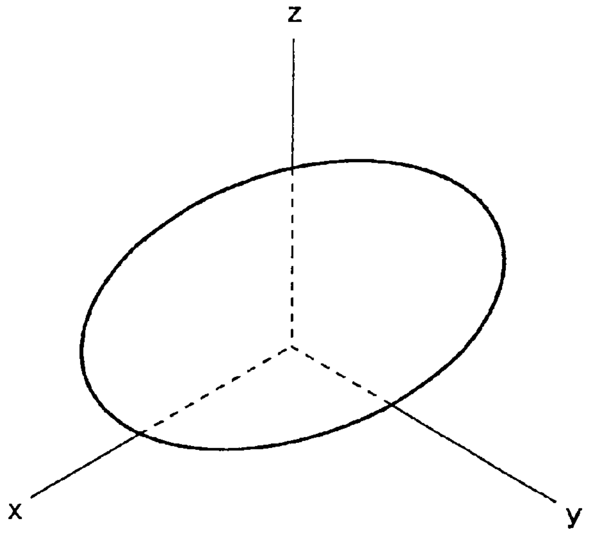
FIG. 8A, FIG. 8B and FIG. 8C are diagrams showing the typical configuration of the toner according to the invention.
Figure 8B:
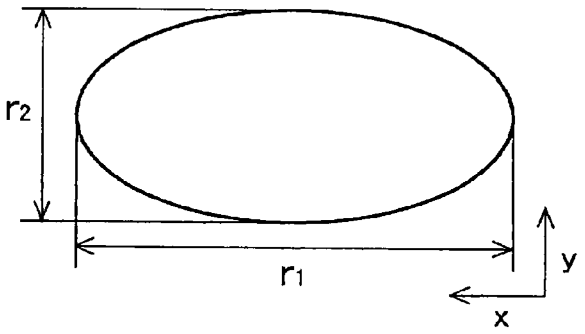
Figure 8C:
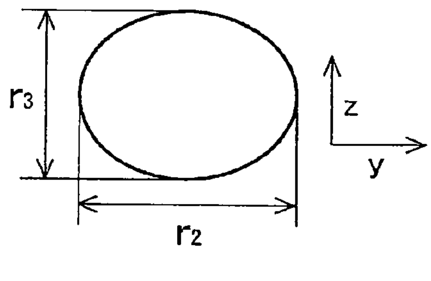

FIG. 8A, FIG. 8B, and FIG. 8C are diagrams showing the typical configuration of the toner according to the present invention.

When the major-axis radius r1, the minor-axis radius r2, and thickness r3 (r1≧r2≧r3) defined in a generally spherical configuration toner, in FIG. 8A, FIG. 8B, and FIG. 8C the toner of the present invention.

It is desirable that the ratio (r3/r2) (refer to FIG. 8C) of thickness and the minor-axis radius has the ratio (r2/r1) (refer to FIG. 8B) of the major-axis radius and the minor-axis radius in the range of 0.7-1.0 by 0.5-1.0.

In order that the ratio (r2/r1) of the major-axis radius and the minor-axis radius may separate from the shape of the spherical form less than by 0.5, dot reproducibility and transfer efficiency are inferior, and the high-definition quality of image is no longer obtained.

Moreover, the ratio (r3/r2) of thickness and the minor-axis radius becomes close to the flat configuration less than by 0.7, and the rate of the high transfer like the spherical form toner is no longer obtained.

Especially, in 1.0, the ratio (r3/r2) of thickness and the minor-axis radius can serve as the body of revolution which sets the axis of rotation as the major-axis radius, and can raise the flowability of the toner.

In addition, it was the scanning electron microscope (SEM), r1, r2, and r3 changed the include angle of the visual field, and they measured it, taking and observing the photograph.

The toner manufactured by the above can be used also as the magnetic toner or non-magnetism toner of 1 ingredients group which does not use the magnetic carrier.

When using for 2 ingredients group developer, it is the ferrite which contains the divalent metals, such as the iron, the magnetite, and Mn, Zn, Cu, as a magnetic carrier, and 20-100 micrometers of volume mean particle diameters are that what is necessary is to mix with the magnetic carrier and just to use desirable.

If it is easy to produce carrier adhesion in the photoconductor 1 at the time of the development and the mean particle diameter exceeds 100 micrometers in less than 20 micrometers, the miscibility with the toner will be low, the amount of charging of the toner will be inadequate, and it will be easy to produce poor charging at the time of continuous duty.

Although it is desirable, in accordance with the process of the image forming apparatus 100, it can choose from Cu ferrite of saturation magnetization containing Zn being high suitably.

Especially as a resin which covers the magnetic carrier, although not limited, there are the silicone resin, the styrene acrylate resin, the fluororesin, the olefine resin, etc.

After having dissolved the coating resin into the solvent, carrying out the spray into the fluid bed, and coating on the core and making the resin grain adhere to the nuclear particle in static electricity, the thermofusion of the manufacture method may be carried out, and it may be covered.

The thickness of the resin covered has 0.05-10-micrometer preferably preferable 0.3-4 micrometers.

Next, some examples of the charging roller and the charging cleaning component according to the present invention will be given.

(Example 1 of Charging Roller)

The resistance adjustment layer is formed by covering with injection molding the composite which blended and created the high molecular compound ("IRGASTAT P18" from "chiba" Specialty Chemicals Co.) 50 weight parts of ion conductivity which contains the polyether ester amide ingredients to the example 1 of ABS-plastics ("GR-1500" from "Denki Kagaku Kogyo" Co.) 100 weight parts on the peripheral surface with a diameter of 8 mm of the roller base made from stainless steel.

The volume resistivity value of the composite is 3×107 ohm-cm. The charging roller (1) with a diameter of 12 mm is produced by applying to the surface of the resistance adjustment layer the mixture which includes the polyamide resin ("daiamido T-171" from "daiseruhyurusu" Co.) and the carbon black (it is the 10% of the weight to the total solid), and forming the protection layer in it.

(Example 2 of Charging Roller)

The resistance of the protection layer is 4×1010 ohm-cm, and the thickness is about 10 micrometers. The resistance adjustment layer was formed by covering with injection molding the composite which blended and created the high molecular compound ("reorekkusu A-1720" from "dai-ichi kogyo seiyaku" Co.) 30 weight parts of ion conductivity which contains the fourth class ammonium-salt group to the <example 2 of charging roller production> ABS-plastics ("GR-1500" from "denki kagaku kogyo" Co.) 100 weight parts to the peripheral surface of the roller base made from stainless steel with a diameter of 8 mm. The volume resistivity value of the composite is 1×108 ohm-cm.

Next, the charging roller (2) with a diameter of 12 mm is produced by applying to the surface of the resistance adjustment layer the mixture which includes the polyamide resin ("daiamido T-171" from "daiseruhyurusu" Co.) and the carbon black (it is the 10% of the weight to the total solid), and forming the protection layer in it. The resistance of the protection layer is 4×1010 ohm-cm, and the thickness is about 10 micrometers.

(Example 1 of Charging Cleaning Component)

The charging cleaning component the periphery side of the example 1 of 5-mm diameter core metal is made to carry out heating compression of the layer which includes the melamine resin foam ("basotekuto" from BASF A.G.), and it sticks on it with adhesive. After the adhesion, the charging cleaning component (1) of the profile of roller with an outside diameter of 8.5 mm is produced by forming so that it may become 1.75 mm in thickness by carrying out the barrel polishing.

Next, the charging roller (1) produced as mentioned above by the group as shown in FIG. 1 as charging roller 14*a*, or (2) are disposed. The charging cleaning component (1) is disposed as the charging cleaning component 14*b*. The spacer tape is stuck on the non-image region of the shaft-orientations both ends of charging roller 14*a*.

The charging roller 14*a* is installed such that the gap between the charging roller 14*a* and the photoconductor drum 11 is set to 50 micrometers.

The voltage supplied to charging roller 14*a* by the power pack is set to DC=−800V and AC=2400 Vpp (frequency=2 kHz), and charging electric potential of the photoconductor drum 11 is measured.

As the result of measurement, when which charging roller was used, there was little dispersion in the charging electric potential of the photoconductor drum surface, and it did not produce charging unevenness, either.

Next, the continuous output test of the image was performed. After 40000-sheet output, as a result of measuring the charging electric potential of the photoconductor drum surface, as compared with the first stage, there was almost no fluctuation. Moreover, it was completely satisfactory also in the acquired image. This shows that cleaning of the charging roller surface is performed by the charging cleaning component preferable, it was stabilized and the charging performance of the charging roller could be maintained.

The present invention is not limited to the above-described embodiments and variations and modifications may be made without departing from the scope of the invention.

The invention claimed is:

1. A cleaning roller that is configured to make contact with a surface of a target member to be cleaned, the cleaning roller comprising:

a core body;

a melamine resin foam that is configured to be provided on a peripheral surface of the core body and make contact with at least the surface of the target member;

wherein the melamine resin foam is formed into a roller configuration; and wherein the cleaning roller is obtained after the melamine foam is compressed with heating from an original shape in a radial direction of the cleaning roller so as to have a tensile strength of the melamine resin foam in a range of 1.7±0.5 kg/cm$^2$.

2. The cleaning roller according to claim 1, wherein a compressibility of the melamine resin foam is 30±15% from the original shape in the radial direction.

3. The cleaning roller according to claim 1, wherein the melamine resin foam including a continuous foam structure and a density in a range of from 5 to 15 kg/m$^3$.

4. The cleaning roller according to claim 1, wherein the target member is a charging roller.

5. The cleaning roller according to claim 4, wherein the cleaning roller is provided to be rotated with a rotation of the charging roller.

6. The cleaning roller according to claim 1, wherein the melamine resin foam includes a continuous foam structure and an rate of elongation in a range of 20 to 40%.

7. An image forming apparatus comprising:

an image bearing member;

a developing device;

a cleaning device; and a charging device including a charging roller and a cleaning roller that is configured to make contact with a surface of the charging roller;

wherein the cleaning roller includes a core body and a melamine resin foam that is configured to be provided on a peripheral surface of the core body and make contact with at least the surface of the target member;

wherein the melamine resin foam is formed into a roller configuration; and wherein the cleaning roller is obtained after the melamine foam is compressed from an original shape in a radial direction of the cleaning roller so as to have a tensile strength of the melamine resin foam in a range of 1.7±0.5 kg/cm$^2$.

8. The image forming apparatus according to claim 7, wherein a compressibility of the melamine resin foam is 30±15% from the original shape in the radial direction.

9. The image forming apparatus according to claim 7, wherein the melamine resin foam including a continuous foam structure and a density in a range of from 5 to 15 kg/m$^3$.

10. The image forming apparatus according to claim 7, wherein the cleaning roller is provided to be rotated with a rotation of the charging roller.

11. The image forming apparatus according to claim 7, wherein the charging roller comprises a resistance adjustment layer made of a resin composite and formed on an outer periphery of a core metal and has a JIS-D hardness of 45 degrees or more.

12. The image forming apparatus according to claim 7, wherein the melamine resin foam includes a continuous foam structure and an rate of elongation in a range of 20 to 40%.

13. A cleaning roller that is configured to make contact with a surface of a target member to be cleaned, the cleaning roller comprising:

a core body;

a melamine resin foam that is configured to be provided on a peripheral surface of the core body and make contact with at least the surface of the target member;

wherein the melamine resin foam is formed into a roller configuration;

wherein the cleaning roller is obtained after the melamine foam is compressed with heating from an original shape in a radial direction of the cleaning roller so as to have a compressibility of 30±15%.

14. The cleaning roller according to claim 13, wherein the melamine resin foam includes a continuous foam structure and a density in a range of from 5 to 15 kg/m$^3$.

15. The cleaning roller according to claim 13, wherein the target member is a charging roller.

16. The cleaning roller according to claim 15, wherein the cleaning roller is provided to be rotated with a rotation of the charging roller.

17. The cleaning roller according to claim 13, wherein the melamine resin foam includes a continuous foam structure and an rate of elongation in a range of 20 to 40%.

* * * * *